(12) United States Patent
Sharma

(10) Patent No.: US 12,518,492 B2
(45) Date of Patent: Jan. 6, 2026

(54) METHOD AND SYSTEM FOR HANDLING EVENTS OF A REAL ENVIRONMENT IN A VIRTUAL REALITY ENVIRONMENT

(71) Applicant: SAMSUNG ELECTRONICS CO., LTD., Suwon-si (KR)

(72) Inventor: Ravi Sharma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 18/238,831

(22) Filed: Aug. 28, 2023

(65) Prior Publication Data

US 2024/0127551 A1    Apr. 18, 2024

(30) Foreign Application Priority Data

Oct. 12, 2022    (IN) .............................. 202211058315

(51) Int. Cl.
| | |
|---|---|
| *G06T 19/00* | (2011.01) |
| *G06F 3/01* | (2006.01) |
| *G06T 19/20* | (2011.01) |
| *G06V 20/40* | (2022.01) |

(52) U.S. Cl.
CPC ............ *G06T 19/006* (2013.01); *G06F 3/017* (2013.01); *G06T 19/20* (2013.01); *G06V 20/44* (2022.01); *G06T 2219/2004* (2013.01); *G06T 2219/2016* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 10,445,941 B2 | 10/2019 | Niles | |
| 10,572,000 B2 | 2/2020 | Cossairt et al. | |
| 10,722,800 B2 | 7/2020 | Tilton et al. | |
| 10,803,663 B2 * | 10/2020 | Wang | G06F 3/011 |
| 10,839,607 B2 * | 11/2020 | Baumbach | G02B 30/10 |

(Continued)

FOREIGN PATENT DOCUMENTS

CN    112533017 A    3/2021

OTHER PUBLICATIONS

Rokhsaritalemi et al., "A Review on Mixed Reality: Current Trends, Challenges and Prospects," Applied Sciences 2020, vol. 10, No. 636, Jan. 2020, total 26 pages, doi: 10.3390/app10020636.

*Primary Examiner* — Ryan M Gray
(74) *Attorney, Agent, or Firm* — Sughrue Mion, PLLC

(57) ABSTRACT

A method for handling an event of a real environment in a virtual reality (VR) environment, includes: identifying an object, a user, and an event occurring in the real environment around a primary user wearing a VR module implemented by at least one hardware processor; determining a first set of parameters of the identified object and the user, and a second set of parameters of the event and an actor in the event, wherein the actor performs the event and is the user; analyzing the VR environment to determine a suitable part in the VR environment; creating an augmented reality (AR) of the actor; scaling, based on the first set of parameters and the second set of parameters, the AR; aligning the AR in relation to the real environment; and merging the aligned AR into the suitable part of the VR environment while maintaining a context of the VR environment.

18 Claims, 15 Drawing Sheets

(56) References Cited

U.S. PATENT DOCUMENTS

| | | | |
|---|---|---|---|
| 11,113,885 B1 | 9/2021 | Cordes et al. | |
| 11,615,596 B2* | 3/2023 | Faulkner | G06T 7/70 |
| | | | 345/633 |
| 11,676,355 B2* | 6/2023 | Palmaro | A63F 13/212 |
| | | | 345/419 |
| 2015/0371447 A1* | 12/2015 | Yasutake | G06T 19/006 |
| | | | 345/633 |
| 2016/0299563 A1* | 10/2016 | Stafford | G02B 27/017 |
| 2017/0169610 A1* | 6/2017 | King | G02B 27/017 |
| 2017/0193679 A1* | 7/2017 | Wu | G06F 3/167 |
| 2017/0287301 A1 | 10/2017 | Taylor et al. | |
| 2017/0291107 A1* | 10/2017 | Lee | A63F 13/213 |
| 2020/0026922 A1* | 1/2020 | Pekelny | G06V 20/20 |
| 2022/0092862 A1* | 3/2022 | Faulkner | G06V 40/28 |
| 2022/0179220 A1 | 6/2022 | Hoover et al. | |
| 2022/0232104 A1* | 7/2022 | Brimhall | H04L 67/131 |
| 2024/0040086 A1* | 2/2024 | Krol | G06T 19/20 |

\* cited by examiner

FIG. 5E
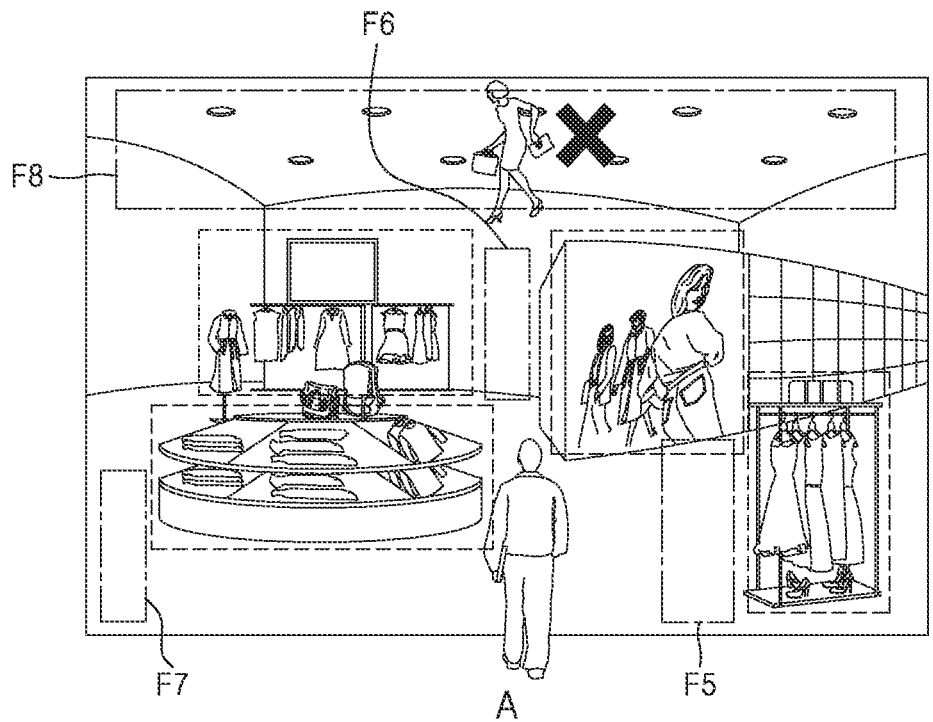
A
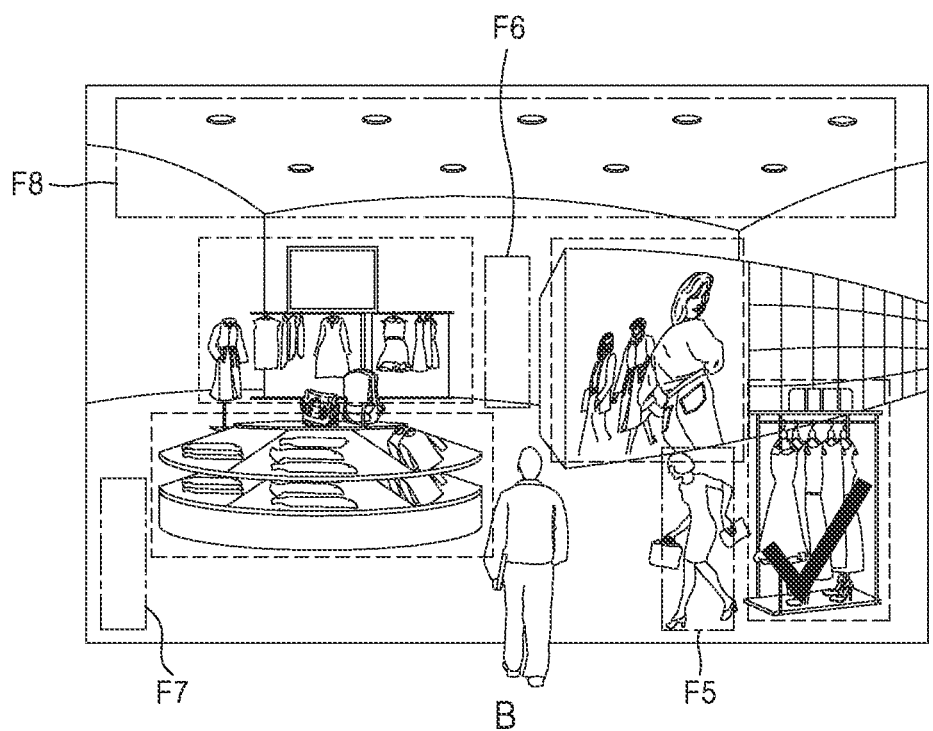
B

FIG. 8B
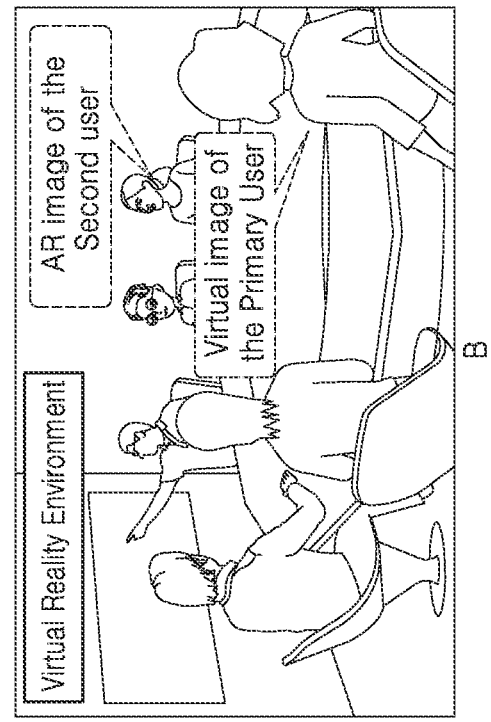
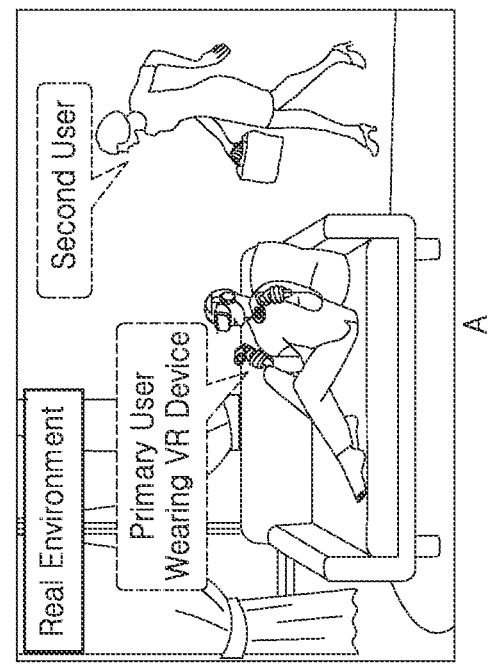

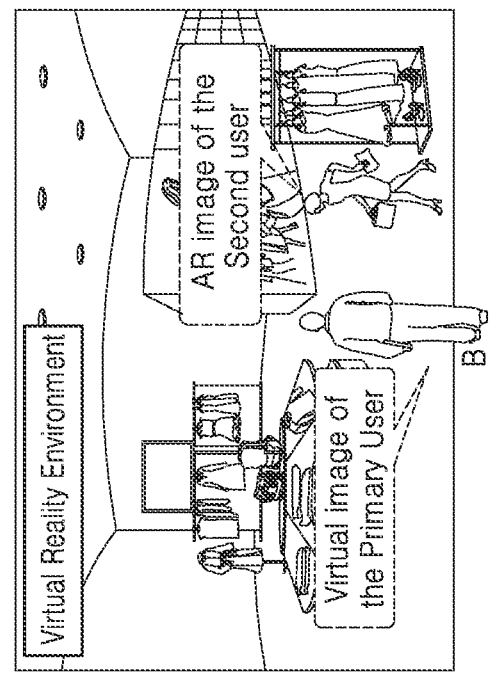
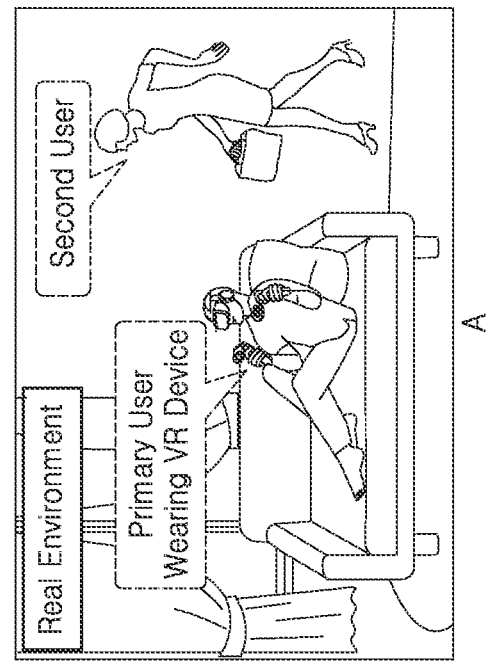
FIG. 8C

METHOD AND SYSTEM FOR HANDLING EVENTS OF A REAL ENVIRONMENT IN A VIRTUAL REALITY ENVIRONMENT

CROSS-REFERENCE TO RELATED APPLICATION(S)

This application is based on and claims priority under 35 U.S.C. § 119 to Indian Patent Application No. 202211058315, filed on Oct. 12, 2022, in the Indian Patent Office, the disclosure of which is incorporated by reference herein in its entirety.

BACKGROUND

1. Field

The present invention relates in general to virtual reality and, more particularly, to a method and system for handling events of a real environment in a virtual reality environment.

2. Description of Related Art

Advancement in computing and display technologies has led to the development of systems providing virtual reality experiences. Generally, virtual reality (VR) is a simulated experience that may be similar to a real world or has the ability to take users into other environments and enable them to experience things they may not be able to experience in their present real world. Earlier, VR was used only for gaming purposes. But now, VR has evolved and is now being used in a wide variety of applications aimed at improving the users' daily lives. VR generally involves the presentation of digital or virtual image information with a VR headset without transparency to the real world, and this lack of connection with the real world has led to the development of augmented reality (AR).

AR provides an interactive experience by adding computer-generated content to the real environment. AR creates an augmented world over the real environment in such a way that AR is perceived as an immersive aspect of the real environment. However, the separation of the real environment from the virtual environment decreases the user immersion level during AR scenarios.

Further, there exists a mixed reality (MR) system which generally works by combining objects from the real environment with the virtual environment and providing interaction in real-time between them. The MR is also known as an extended reality or a hybrid of VR and AR. The MR system provides an environment, which includes both the real and virtual environment in such a way that a window gets created between them. In the MR environment, as the real and virtual environments are intertwined, managing both seamlessly is very important to enhance the user experience. Further, the MR system is also required to provide the events happening in the real environment without disrupting the virtual environment so that the user does not have to worry about missing anything that is happening around him.

Therefore, there is a need for such an MR system that can provide the user with all the events happening in the real environment without disrupting the virtual environment so that the user can not miss the events happening in the real environment and automatically reduces the user's concerns about events happening in the real environment, reduces the effort to check up on events happening in the real environment from time to time, and makes the user confident about responding to the events while immersed in the virtual environment.

At present, there exist technology that provide awareness to the user about the real environment, while experiencing the virtual reality environment.

The related art technology may include virtual reality proximity sensors. There may be a proximity device, a computer-implemented method, and a proximity system. The proximity device may a wearable proximity device or a non-wearable proximity device. The wearable proximity device may be configured to be worn by a user. As the user moves within a physical environment, the wearable proximity device may monitor the user's proximity to objects. Proximity indications may be accordingly generated and presented to the user. The non-wearable proximity device may be configured to monitor the user's proximity relative to a perimeter of an area. If the user approaches or overruns the perimeter, a proximity indication may be generated and presented to the user. However, the technology is deficient as to aspects of analyzing events and associated actors in the real environment, determining suitable part of the virtual environment for merging virtual images of the actors performing events in the real environment, and maintaining the context of the virtual environment intact. In addition, the technology is silent on merging the scaled augmented reality of the actors in the virtual environment.

Further, the related art technology may include a co-presence handling process in virtual reality. There may be a method for controlling a co-presence virtual environment for a first user and a second user. The method may include determining a first avatar's restricted space in the co-presence virtual environment. In one embodiment, the first avatar may correspond to the first user of the co-presence virtual environment. The method may further include receiving user position data from a first computing device associated with the first user and determining the first avatar's location within the co-presence virtual environment. In one embodiment, when the first avatar's location is within the first avatar's restricted space, the first co-presence virtual environment modification data may be communicated to the first computing device and the second co-presence virtual environment modification data may be communicated to a second computing device associated with the second user. However, technology is deficient as to aspects of analyzing events and associated actors in the real environment, determining suitable parts of the virtual environment for merging virtual images of the actors performing events in the real environment, and maintaining the context of the virtual environment intact. In addition, the technology is silent on merging the scaled augmented reality of the actors in the virtual environment.

In addition, the related art technology may involve an automatic placement of a virtual object in a three-dimensional space. There may be augmented reality systems and methods for automatically repositioning a virtual object with respect to a destination object in a three-dimensional (3D) environment of a user. The systems and methods may automatically attach the target virtual object to the destination object and re-orient the target virtual object based on the affordances of the virtual object or the destination object. The systems and methods may also track the movement of a user and detach the virtual object from the destination object when the user's movement passes a threshold condition. However, the about the technology is deficient as to aspects of analyzing events and associated actors in the real environment, determining suitable parts of the virtual environment for merging the virtual image of the actors performing events in the real environment, and maintaining the context of the virtual environment intact. In addition, the technology is silent on merging the scaled augmented reality of the actors in the virtual environment.

Therefore, in light of the foregoing discussion, there exists a need to overcome the aforementioned drawbacks associated with the related art method and system for handling events of the real environment in the virtual reality environment.

SUMMARY

According to an aspect of the disclosure, a method for handling an event of a real environment in a virtual reality (VR) environment, includes: identifying an object, a user, and an event occurring in the real environment around a primary user wearing a VR module implemented by at least one hardware processor; determining a first set of parameters of the identified object and the user, and a second set of parameters of the event and an actor in the event, wherein the actor performs the event and is the user; analyzing the VR environment to determine a suitable part in the VR environment; creating an augmented reality (AR) of the actor; scaling, based on the first set of parameters and the second set of parameters, the AR; aligning the AR in relation to the real environment; and merging the aligned AR into the suitable part of the VR environment while maintaining a context of the VR environment.

The VR module may be configured to provide information of the primary user and the VR module, including an absolute location and an absolute direction of the primary user and the VR module with respect to the real environment.

The object and the user in the real environment may be identified by an environment sensing sub-module, the first set of parameters of the object and the user may be determined by the environment sensing sub-module, the event occurring in the real environment may be identified by a real world scene analyzing sub-module, the second set of parameters of the identified event and the actor in the event may be determined by the real world scene analyzing sub-module, and the environment sensing sub-module and the real world scene analyzing sub-module are implemented by the at least one hardware processor.

The environment sensing sub-module may be configured to communicate with a sensor, a location awareness sub-module, and an orientation awareness sub-module, the sensor may be configured to identify the object and the user in the real environment and includes any of an image sensor, a touch sensor, a wearable sensor, a non-wearable sensor, and an audio sensor, the location awareness sub-module and the orientation awareness sub-module are configured to determine the first set of parameters including absolute location and absolute direction of the object, the user, and a relative location and a direction of the object and the user with respect to the absolute location and the absolute direction of the primary user and the VR module, and the location awareness sub-module and the orientation awareness sub-module are implemented by the at least one hardware processor.

The real world scene analyzing sub-module may be configured to: implement an object and actor analysis, an event and activity analysis, a gesture and an emotion analysis, and a relative position and orientation analysis identifying the event in the real environment, and determine the second set of parameters, of the event and the actor in the event, and indicate an activity performed in the event, a gesture, an audio, an emotion, a size, a location and a direction of the actor, a distance of the actor from the primary user, a direction of the actor with respect to the primary user and an orientation, an inclination, and a view angle with respect to the VR module.

The suitable part in the VR environment may be determined by a virtual space analyzing module which includes a virtual frame analyzing sub-module configured to: split a frame of the VR environment into a plurality of parts, determine an absolute and relative orientation of each of the plurality of parts with respect to a virtual image of the primary user in the frame, identify the object in at least one of the plurality of parts, and analyze a contextual importance of the object for the frame of the VR environment, and the virtual space analyzing module and the virtual frame analyzing sub-module are implemented by the at least one hardware processor.

The virtual space analyzing module may include a target area selection sub-module configured to: identify, from the plurality of parts of the frame, a part of the frame that is editable and is determined to contains no significant information, receive a size of the actor and a distance of actor from the primary user, and determine the suitable part of the frame from the part based on the size and the distance of the actor.

The second set of parameters may indicate a gesture, an emotion, an audio, an activity, a view angle, a direction of the actor, and an inclination, and the AR may be scaled based on the distance of the actor with respect to the primary user.

The aligning the AR of the actor in relation to the real environment may be performed by an AR alignment sub-module, the merging the AR in the suitable part of the VR environment may be performed by an AR placement sub-module, and the AR alignment sub-module and the AR placement sub-module are implemented by the at least one hardware processor.

According to an aspect of the disclosure, a system for handling an event of a real environment in a virtual reality (VR) environment, includes: a memory storing instructions; and at least one processor configured to execute the instructions to implement: a real space sensing module configured to identify an object, a user, and an event occurring in the real environment around a primary user wearing a VR module, of the system and implemented by the at least one processor, the real space sensing module further determine a first set of parameters, of the object and the user, and a second set of parameters, of the event and an actor in the events, wherein the actor performs the event and is the user; a virtual space analyzing module configured to analyze the VR environment to determine a suitable part in the VR environment; an augmented reality (AR) generation module, configured to create an AR of the actor and, based on the first set of parameters and the second set of parameters, scales of the AR; and a virtual scene processing module configured to align the AR in relation to the real environment, merges the AR into the suitable part of the VR environment while maintaining a context of the VR environment.

The VR module may be configured to provide information, of the primary user and the VR module, including an absolute location and an absolute direction of the primary user and the VR module with respect to the real environment.

The real space sensing module may include: an environment sensing sub-module configured to identify the object and the user in the real environment and determine the first set of parameters of the object and the user; and a real world scene analyzing sub-module configured to identify the event occurring in the real environment and determine the second set of parameters of the event and the actor in the event.

The environment sensing sub-module may be configured to communicate with a sensor, a location awareness sub-module, and an orientation awareness sub-module, the sensor may be configured to identify the object and the user in the real environment and includes any of an image sensor, a touch sensor, a wearable sensor, a non-wearable sensor, and an audio sensor, and the location awareness sub-module and the orientation awareness sub-module are configured to determine the first set of parameters including absolute location and absolute direction of the objects, the user, and a relative location and a direction of the object and the user with respect to the absolute location and the absolute direction of the primary user and the VR module.

The real world scene analyzing sub-module may be configured to: implement an object and actor analysis, an event and activity analysis, a gesture and an emotion analysis, and a relative position and orientation analysis identifying the event in the real environment, and determine the second set of parameters, of the event and the actor in the event, and indicates an activity performed in event, a gesture, an audio, an emotion, a size, a location and a direction of the actor, a distance of the actor from the primary user, a direction of the actor with respect to the primary user and an orientation, an inclination, and a view angle with respect to the VR module.

The virtual space analyzing module may include: a virtual frame analyzing sub-module including: a virtual frame partitioning sub-module configured to: split a frame of the VR environment into a plurality of parts, and determine an absolute and relative orientation of each of the plurality of parts with respect to virtual image of the primary user in the frame; an object and context identification sub-module configured to: identify the object in at least one of the plurality of parts, and analyze a contextual importance of the object for the frame of the VR environment; and a target area selection sub-module including: a non-significant area identification sub-module configured to identify, from the plurality of parts of the frame, a part of the frame that is editable and is determined to contain no significant information; and a final target area selecting sub-module configured to receive a size of the actor and a distance of the actor from the primary user, and determine the suitable part of the frame from the part based on the size and the distance of the actor.

The AR generation module may include: a digital twin creation sub-module configured to create the AR of the actor determined the event; an integration sub-module configured to integrate the second set of parameters which indicate a gesture, an emotion, an audio, an activity, a view angle, a direction of the actor, and an inclination, and the integration sub-module may be configured to scale the AR based on the distance of the actor with respect to the primary user.

The virtual scene processing module may include: an AR alignment sub-module configured to align the AR of the event in relation to the real environment; and an AR placement sub-module configured to: merge the AR into the suitable part of the VR environment; and maintain the context of the VR environment.

The foregoing summary is illustrative only and is not intended to be in any way limiting. In addition to the illustrative aspects, embodiments, and features described earlier, further aspects, embodiments, and features will become apparent by reference to the drawings and the following detailed description.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5E illustrates a pictorial representation of the suitable part of the frame for positioning the AR of one or more actors, in accordance with one or more embodiments;

FIG. 8B illustrates a second use case for handling one or more events of a real environment in a virtual reality environment, in accordance with one or more embodiments.

FIG. 8C illustrates a third use case for handling one or more events of a real environment in a virtual reality environment, in accordance with one or more embodiments.

DETAILED DESCRIPTION

In the following description, numerous specific details are set forth in order to provide a thorough understanding of the present disclosure. It will be apparent, however, to one skilled in the art that these specific details are only exemplary and not intended to be limiting. Additionally, it may be noted that the systems and/or methods are shown in block diagram form only in order to avoid obscuring the present disclosure. It is to be understood that various omissions and substitutions of equivalents may be made as circumstances may suggest or render expedient to cover various applications or implementations without departing from the spirit or the scope of the present disclosure. Further, it is to be understood that the phraseology and terminology employed herein are for the purpose of clarity of the description and should not be regarded as limiting.

Furthermore, in the present description, references to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily referring to the same embodiment, nor are separate or alternative embodiments mutually exclusive of other embodiments. Further, the terms "a" and "an" used herein do not denote a limitation of quantity, but rather denote the presence of at least one of the referenced items. Moreover, various features are described which may be exhibited by some embodiments and not by others. Similarly, various requirements are described, which may be requirements for some embodiments but not for other embodiments.

Figure 1:
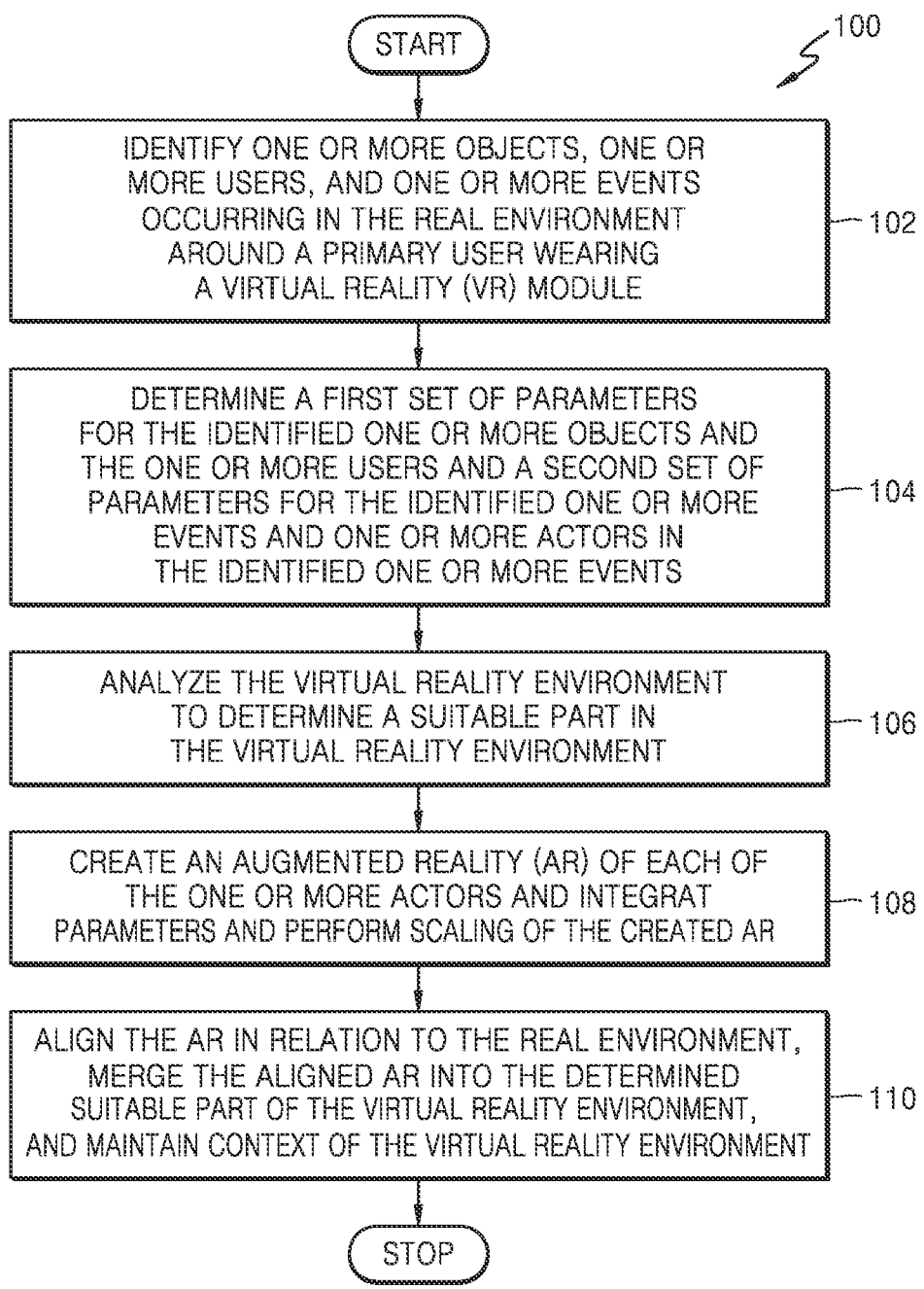
FIG. 1 illustrates a flow diagram showing a method for handling one or more events of a real environment in a virtual reality environment, in accordance with one or more embodiments.

FIG. 1 shows a flow diagram showing a method (100) for handling one or more events of a real environment in a virtual reality environment according to one or more embodiment. The method may be explained in conjunction with the system disclosed in FIG. 2. In the flow diagram, each block may represent a module, segment, or portion of code, which includes one or more executable instructions for implementing the specified logical function(s). It should also be noted that in some alternative implementations, the functions noted in the blocks may occur out of the order noted in the drawings. For example, two blocks shown in succession in FIG. 1 may be executed substantially concurrently or the blocks may sometimes be executed in the reverse order, depending upon the functionality involved. Any process descriptions or blocks in flowcharts should be understood as representing modules, segments, or portions of code that include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

Referring to FIG. 1, one or more objects, one or more users, and one or more events occurring in the real environment are identified, at operation (102). In one embodiment, the one or more objects, one or more users, and one or more events occurring in the real environment are identified around a primary user wearing a virtual Reality (VR) module. In one exemplary embodiment, the VR module may be an electronic device including at least but not limited to a VR headset, a head-up display (HUD), a head-mounted display (HMD), a mobile phone, any wearable, and hand-held electronic device capable of computing through a software application. The VR module is configured to provide one or more information about the primary user and the VR module, which includes the absolute location and absolute direction of the primary user and the VR module with respect to the real environment. The VR module provides the one or more information by utilizing one or more sensors integrated with the VR module. Successively, a first set of parameters for the identified one or more objects and the one or more users and a second set of parameters for the identified one or more events and one or more actors in the identified one or more events are determined, at operation (104). In one embodiment, the first set of parameters includes an absolute location and absolute direction of each of the one or more objects and each of the one or more users and the relative location and direction of each of the one or more objects and each of the one or more users with respect to the absolute location and absolute direction of the primary user and the VR module collected from the VR module. The second set of parameters includes activity performed in the one or more events, gesture, audio, emotion, size, location, and direction of each of the one or more actors, distance of each of the one or more actors from the primary user, direction of each of the one or more actors with respect to the primary user and orientation, inclination, and view angle with respect to the VR module.

Successively, the virtual reality environment is analyzed, at operation (106). In one embodiment, the virtual reality environment displayed in the VR module is analyzed to determine a suitable part in the virtual reality environment. Successively, augmented reality (AR) of each of the one or more actors is created and parameters are integrated with the created AR, and scaling of the created AR is performed, at operation (108). In one embodiment, the parameters integrated with the AR include gesture, emotion, audio, activity, view angle, direction of each of the one or more actors, and inclination based on the second set of parameters, and the AR is scaled as per distance of each of the one or more actors with respect to the primary user to provide a virtual depiction of the identified one or more events occurring in the real environment.

Thereafter, the AR in relation to the real environment is aligned and merged into the determined suitable part of the virtual reality environment, and the context of the virtual reality environment is maintained, at operation (110). In one embodiment, the context of the virtual reality environment is maintained by not disrupting the seamless virtual environment and utilizing only the suitable part of the virtual reality environment for making the user aware of the one or more events occurring in the real environment.

Figure 2:
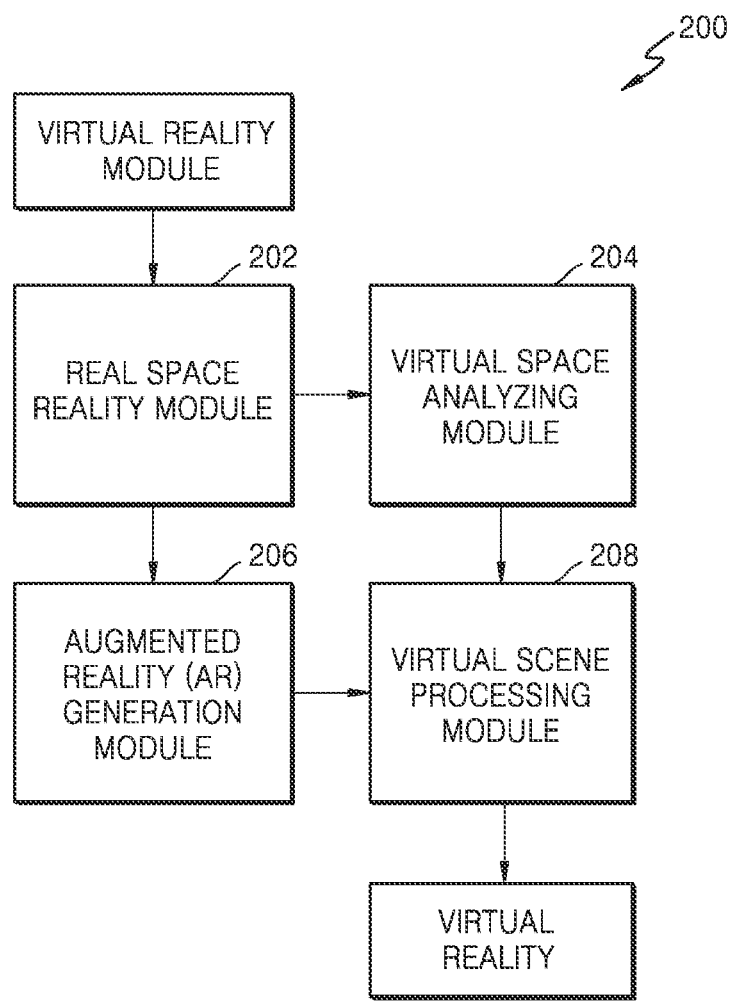
FIG. 2 illustrates a block diagram of a system for handling one or more events of the real environment in the virtual reality environment, in accordance with one or more embodiments.

Referring to FIG. 2 a block diagram of a system (200) for handling one or more events of the real environment in the virtual reality environment is illustrated, in accordance with one or more embodiments. The system may include a plurality of modules for handling one or more events of the real environment in the virtual reality environment. At least one of the plurality of modules may be implemented through an AI model. A function associated with AI may be performed through the non-volatile memory, the volatile memory, and the processor.

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of the desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through the calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

In one embodiment, the system (200) includes a real space sensing module (202) for identifying one or more objects, one or more users, and one or more events occurring in the real environment around a primary user wearing a VR module and determining a first set of parameters for the identified one or more objects and the one or more users and a second set of parameters for the identified one or more events and one or more actors in the identified one or more events. The one or more actors are the one or more users that performs the identified one or more events. The real space sensing module (202) is described in more detail with reference to FIG. 3.

Figure 3:
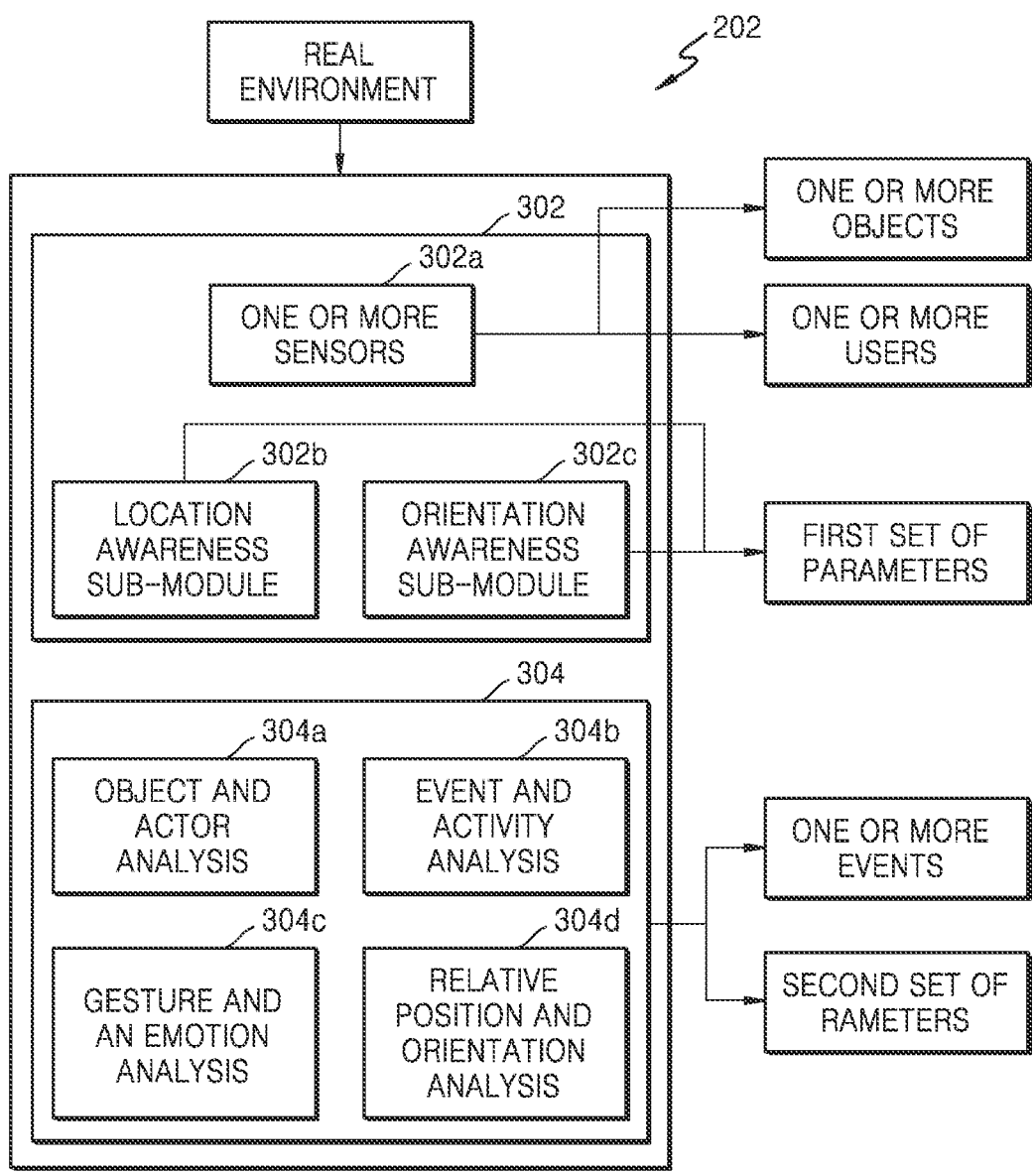
FIG. 3 illustrates a block diagram of a real space sensing module, in accordance with one or more embodiments.

Referring to FIG. 3 a block diagram of the real space sensing module (202) is illustrated, in accordance with one or more embodiments. As illustrated, the real space sensing module (202) includes an environment sensing sub-module (302). The environment sensing sub-module (302) is configured for identifying one or more objects and the one or more users in the real environment. In one embodiment, the environment sensing sub-module (302) utilizes one or more sensors (302a) such as an image sensor, a touch sensor, a wearable sensor, a non-wearable sensor, and an audio sensor for identifying the one or more objects and the one or more users in the real environment. In addition, the one or more sensors (302a) include an inertial measurement unit (IMU) that can include an accelerometer, a gyroscope, and a magnetometer. It should be noted that the sensors are an integral part of the VR module mounted on the surface of the VR module. Some VR modules even have six degrees of freedom (6DoF) system for head tracking. The 6DoF system helps in tracking head movements and repositions by utilizing gyroscopes, accelerometers, and other sensors.

The environment sensing sub-module (302) further includes a location awareness sub-module (302b) and an orientation awareness sub-module (302c) for determining the first set of parameters including absolute location and absolute direction of each of the one or more objects and each of the one or more users and relative location and direction of each of the one or more objects and each of the one or more users with respect to the absolute location and absolute direction of the primary user and the VR module collected from the VR module. In an exemplary embodiment, when the primary user is sitting on a sofa in the living room and wearing a VR module. The environment sensing sub-module (302) determines the one or more objects, one or more users, and the first set of parameters as disclosed in Table 1.

TABLE 1 discloses one or more objects, one or more users, and the first set of parameters

| One or More Objects and One or More Users | Absolute Location | Absolute Direction | Relative Location and Direction w.r.t. Primary User and the VR Module |
|---|---|---|---|
| Primary User | Living Room Sofa | East | — |
| HMD Device | Living Room Sofa | 10 Degree Clockwise From East Towards East South East (ESE) | — |
| TV | Living Room, East Wall | East | 10 Feet From Living Room Sofa Towards East |
| Sofa | Living Room, Centre | Facing towards East | 10 Feet From East Wall Towards West |
| Door | Corner of North West wall of living room | North-Northwest (NNW) | 20 Feet From Living Room Sofa Towards NNW |

The real space sensing module (202) further includes a real world scene analyzing sub-module (304). The real world scene analyzing sub-module (304) is configured for identifying the one or more events occurring in the real environment and determining the second set of parameters for the identified one or more events and the one or more actors in the identified one or more events. In one embodiment, the real world scene analyzing sub-module (304) includes an object and actor analysis (304a), an event and activity analysis (304b), a gesture and an emotion analysis (304c), and a relative position and orientation analysis (304d) for identifying the one or more events in the real environment and determining the second set of parameters for the identified one or more events and the one or more actors in the identified one or more events.

Figure 4:
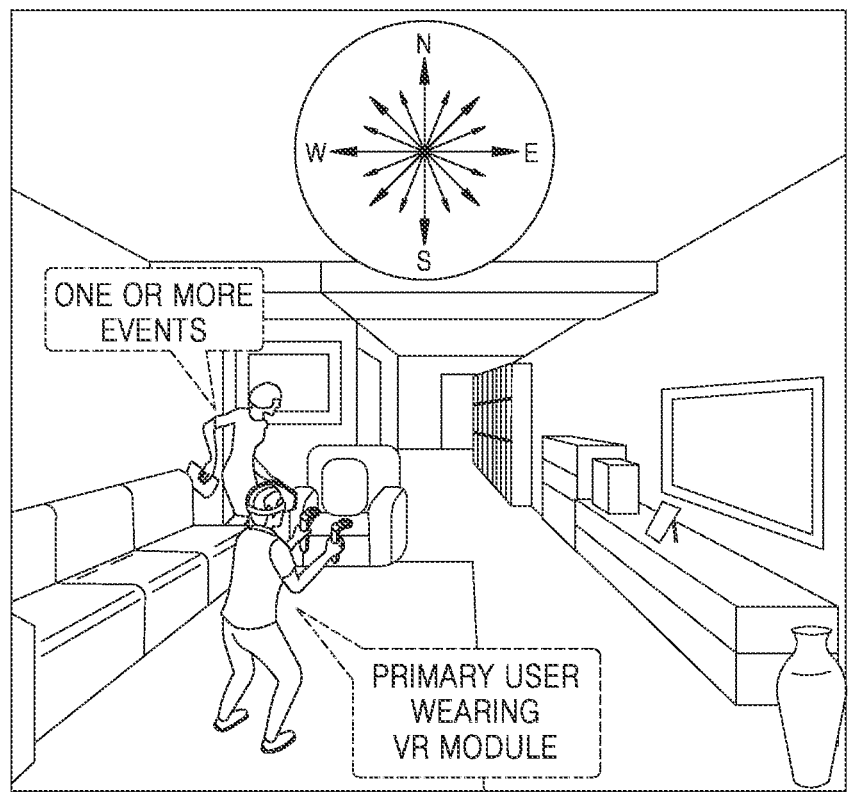
FIG. 4 illustrates a pictorial representation of the real environment, in accordance with one or more embodiments.

Referring to FIG. 4 a pictorial representation of the real environment is illustrated, in accordance with one or more embodiments. As illustrated, the primary user is sitting on a sofa in the living room and wearing a VR module. The real world scene analyzing sub-module (304) identifies the second user is entering the living room and determines the second set of parameters as disclosed in Table 2a and 2b.

TABLE 2a

| The Second set of parameters | | | |
|---|---|---|---|
| One or More Events | One or More Actors | Location | Direction |
| Primary User Sitting On Sofa | Primary User | Living Room Sofa | Facing East |
| Second User is Entering the Living Room | Second User | Living Room Door | Facing and Moving Towards South |

TABLE 2b

The Second set of parameters

| One or More Actors | Activity | Gesture and Emotion | Distance from Primary User | Direction w.r.t. Primary user | Audio | Orientation w.r.t. VR Module |
|---|---|---|---|---|---|---|
| Second User | Walking | Hands down and smiling | 10 feet | North West | No | 135 degree anticlockwise |

The system (200) further includes a virtual space analyzing module (204). The virtual space analyzing module (204) is configured for analyzing the virtual reality environment to determine a suitable part in the virtual reality environment. The virtual space analyzing module (204) is described in more details with reference to FIG. 5A, FIG. 5B, FIG. 5C, FIG. 5D, and FIG. 5E.

Figure 5A:
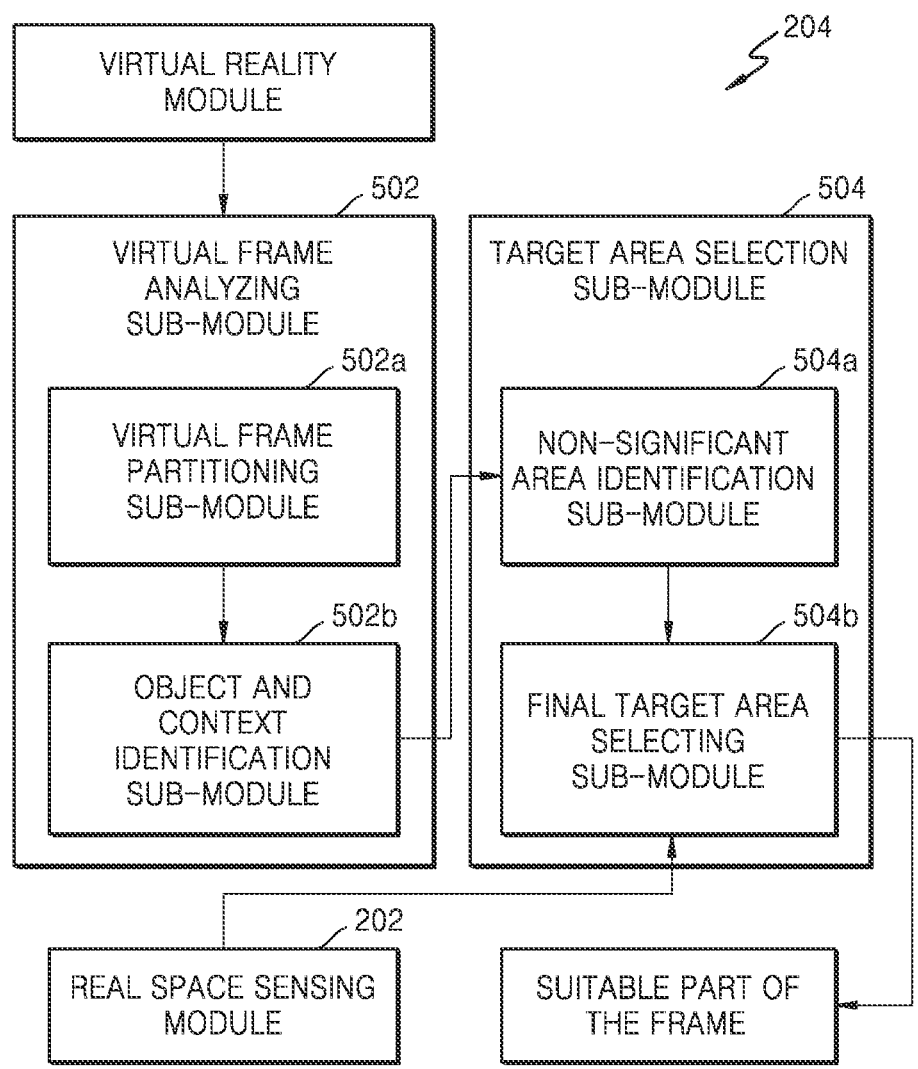
FIG. 5A illustrates a block diagram of a virtual space analyzing module, in accordance with one or more embodiments.

Referring to FIG. 5A a block diagram of a virtual space analyzing module (204) is illustrated, in accordance with one or more embodiments. The virtual space analyzing module (204) includes a virtual frame analyzing sub-module (502) and a target area selection sub-module (504). The virtual frame analyzing sub-module (502) includes a virtual frame partitioning sub-module (502a) configured for splitting a frame of the virtual reality environment into a plurality of parts as illustrated in FIG. 5B.

Figure 5B:
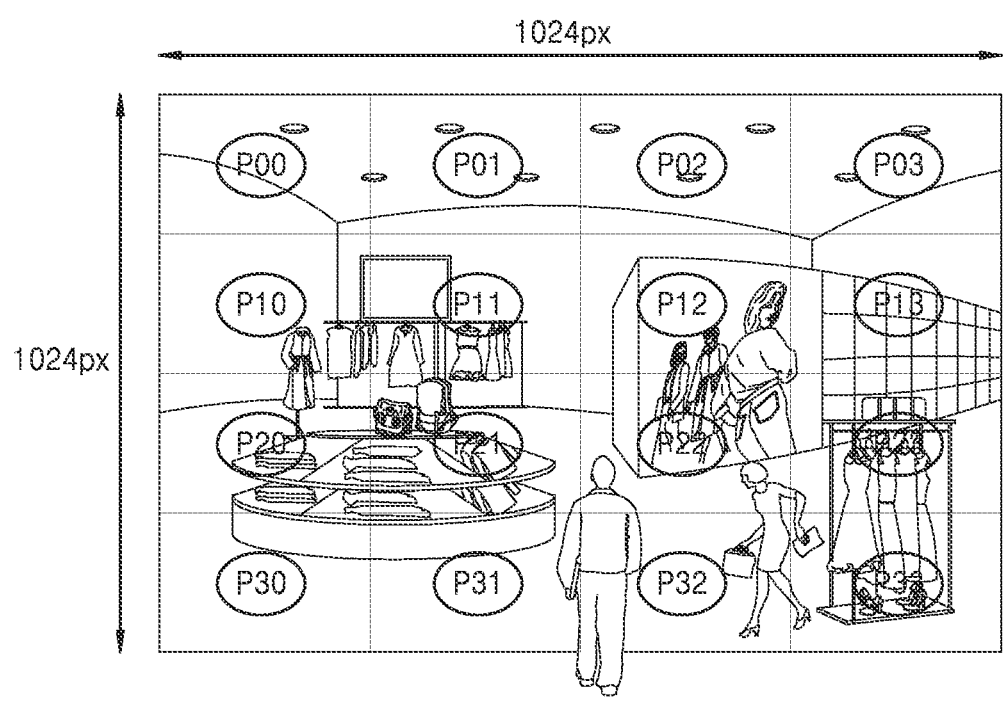
FIG. 5B illustrates a pictorial representation of partitioning of the virtual frame, in accordance with one or more embodiments.

Referring to FIG. 5B a pictorial representation of partitioning of the virtual frame is illustrated, in accordance with one or more embodiments. As illustrated, the virtual frame of pixel size (1024×1024) is equally divided and represented as P00, P01, P02 . . . P33.

The virtual frame partitioning sub-module (502a) is further configured for determining an absolute and relative orientation of each of the plurality of parts with respect to the virtual image of the primary user in the frame as disclosed in Table 3. Table 3 discloses the absolute and relative orientation of each of the plurality of parts illustrated in FIG. 5B.

TABLE 3

Absolute and Relative orientation of each of the plurality of parts

| Plurality of Parts | Absolute Orientation | Relative Orientation |
|---|---|---|
| P00 | (0, 0) to (256, 256) | NW |
| P11 | (256, 256) to (512, 512) | NNW |
| P23 | (512, 768) to (768, 1024) | E |
| P31 | (768, 256) to (1024, 512) | SSW |
| Primary User | (640, 384) to (1024, 550) | Reference |

Figure 5C:
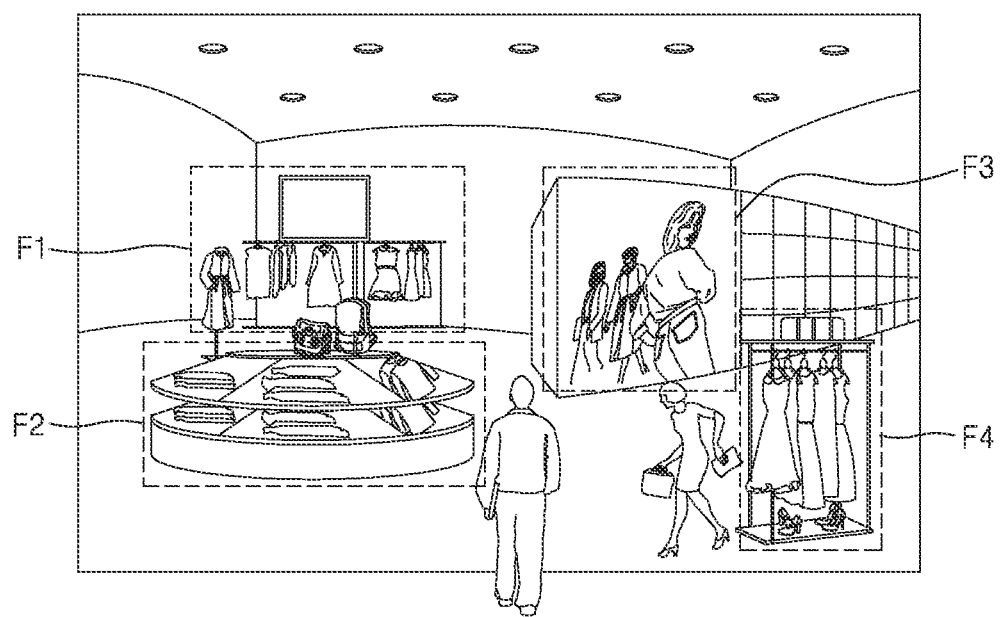
FIG. 5C illustrates a pictorial representation of identified one or more objects in the plurality of parts, in accordance with one or more embodiments.

The virtual frame analyzing sub-module (502) further includes an object and context identification sub-module (502b) configured for identifying the one or more objects in each of the plurality of parts as illustrated in FIG. 5C.

Referring to FIG. 5C a pictorial representation of identified one or more objects in each of the plurality of parts is illustrated, in accordance with one or more embodiments. As illustrated, F1 F2, F3, and F4 are a plurality of parts of the frame that contains one or more objects. The object and context identification sub-module further analyzes the contextual importance of each of the one or more objects for the frame of the virtual reality environment. Table 4 discloses the analyzed contextual importance for the identified one or more objects.

TABLE 4

Analyzed contextual importance for the identified one or more objects

| Object ID | One or more Objects | Importance | Location |
|---|---|---|---|
| F1 | Clothes & TV | Important | (356, 200) to (660, 400) |
| F2 | Stack of clothes | Important | (x1, y1) to (x2, y2) |
| F3 | Wall TV | Important | (x3, y3) to (x4, y4) |
| F4 | Cloth Stands | Important | (x5, y5) to (x6, y6) |

Figure 5D:
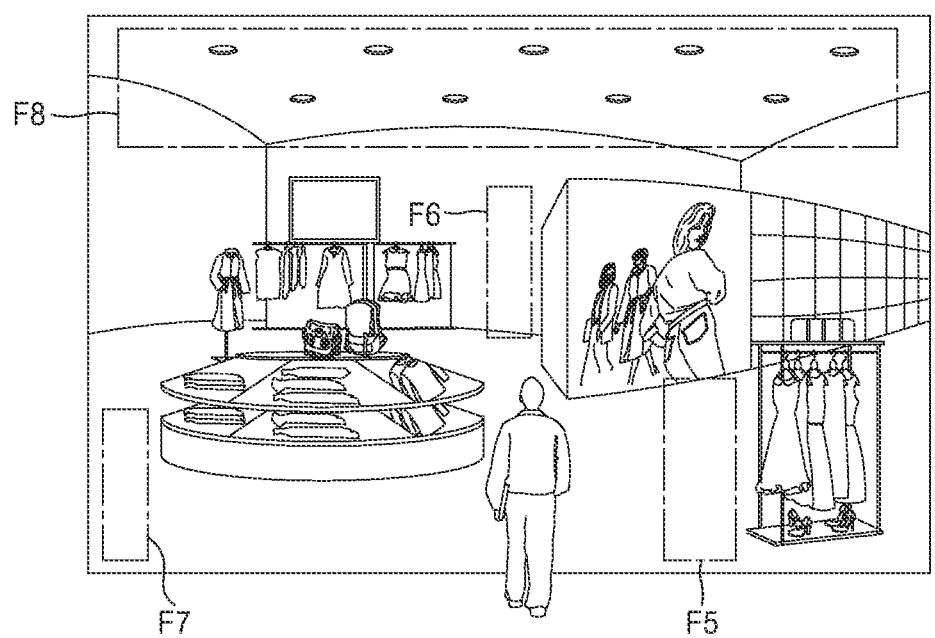
FIG. 5D illustrates a pictorial representation of identified no object or non-significant information in the plurality of parts of the frame, in accordance with one or more embodiments.

The target area selection sub-module (504) includes a non-significant area identification sub-module (504a) configured for identifying one or more parts of the frame that are editable and contains no object or non-significant information from the plurality of parts of the frame, as illustrated in FIG. 5D.

Referring to FIG. 5D a pictorial representation of identified no object or non-significant information in the plurality of parts of the frame is illustrated, in accordance with one or more embodiments. As illustrated, F5 F6, F7, and F8 are one or more parts of the frame that are editable and contain no object or non-significant information. Table 5 discloses the one or more parts of the frame that are editable and contains no object or non-significant information.

TABLE 5

The one or more parts of the frame that are editable and contain no object or non-significant information

| Object ID | One or more Objects | Significance | Location |
|---|---|---|---|
| F5 | Empty | No Significance | (x7, y7) to (x8, y8) |
| F6 | Empty | No Significance | (x9, y9) to (x10, y10) |
| F7 | Empty | No Significance | (x11, y11) to (x12, y12) |
| F8 | Empty | No Significance | (x13, y13) to (x14, y14) |

The target area selection sub-module (504) further includes a final target area selecting sub-module (504b) configured for receiving size of the one or more actors and the distance of the one or more actors from the primary user from the real space sensing module (202) and determining suitable part of the frame from the identified one or more parts based on the received size and distance of the one or more actors, as illustrated in FIG. 5E.

Referring to FIG. 5E a pictorial representation of the suitable part of the frame for positioning the AR of one or more actors is illustrated, in accordance with one or more embodiments. In an exemplary embodiment, the actor should not be positioned on a wall or roof considering the real world capabilities and limitations of the one or more actors and further, no object, which is relatively near to the primary user should go in the background. Therefore, F8 is determined to not be a suitable part of the frame for positioning the one or more actors as shown in Image (A). Further, the suitable part of the frame should be in the best direct view angle of the virtual image of the primary user in the virtual environment and is the best fit for scaled AR's orientation as per the real world. Therefore, F5 is determined to be considered as the suitable part of the frame for positioning the one or more actors as shown in Image (B).

The system (200) further includes an augmented reality (AR) generation module (206). The AR generation module (206) is configured for creating an AR of each of the one or more actors and integrating parameters and performing scaling of the created AR. The AR generation module (206) is described in more details with reference to FIG. 6.

Figure 6:
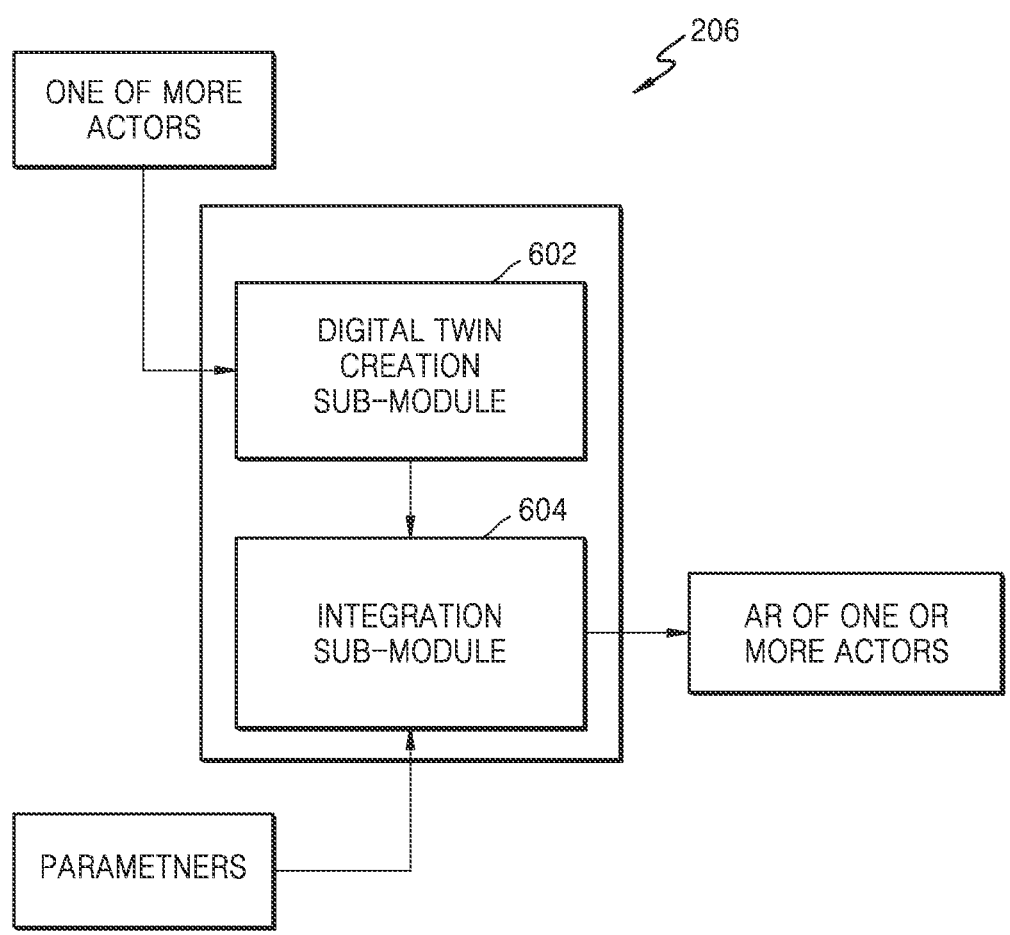
FIG. 6 illustrates a block diagram of an AR generation module, in accordance with one or more embodiments.

Referring to FIG. 6, a block diagram of an AR generation module is illustrated, in accordance with one or more embodiments. The AR generation module (206) includes a digital twin creation sub-module (602) configured for creating the AR of each of the one or more actors determined in the one or more events. The AR generation module (206) further includes an integration sub-module (604), configured for integrating parameters including gesture, emotion, audio, activity, view angle, direction of each of the one or more actors, and inclination based on the second set of parameters with the created AR and scaling as per as per distance of each the one or more actors with respect to the primary user.

The system (200) further includes a virtual scene processing module (208). The virtual scene processing module (208) is configured for aligning the AR in relation to the real environment, merging the aligned AR into the determined suitable part of the virtual reality environment, and maintaining context of the virtual reality environment. The virtual scene processing module (208) is described in more details with reference to FIG. 7A and FIG. 7B-7B.

Figure 7A:
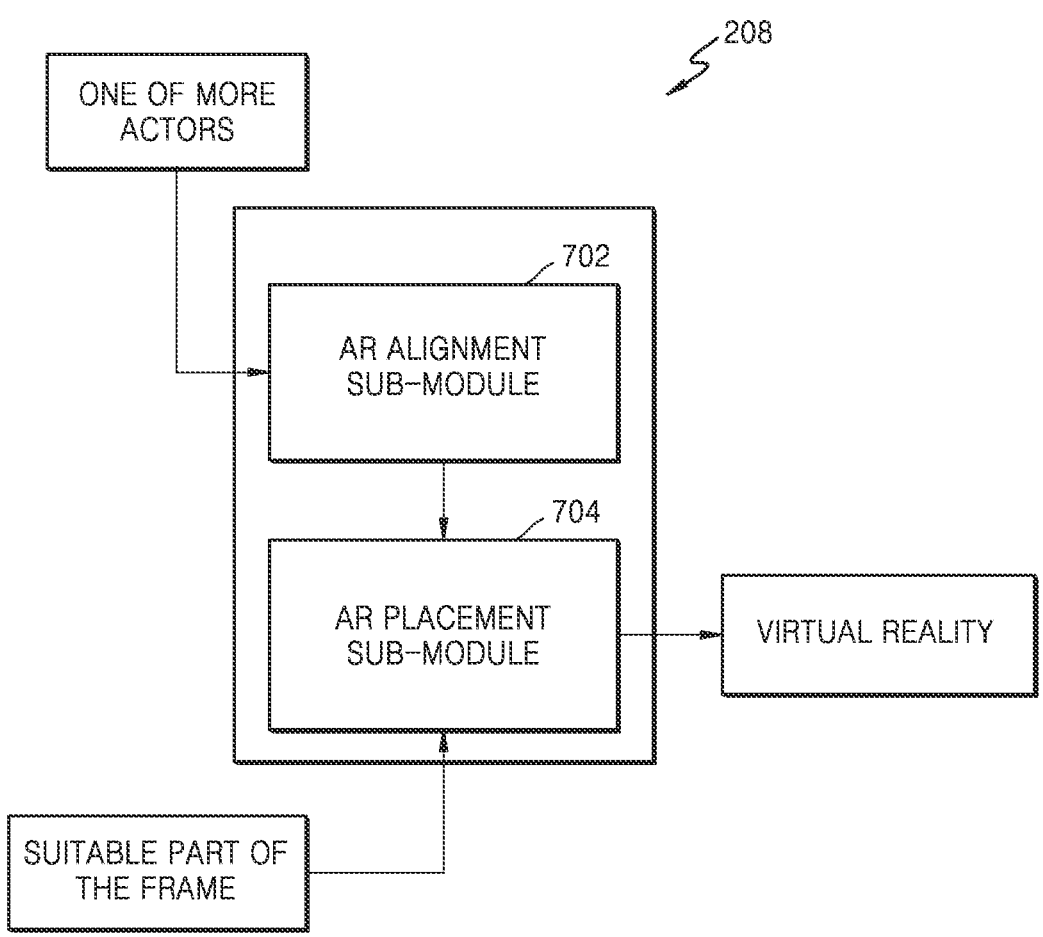
FIG. 7A illustrates a block diagram of a virtual scene processing module, in accordance with one or more embodiments.
Figure 7B:
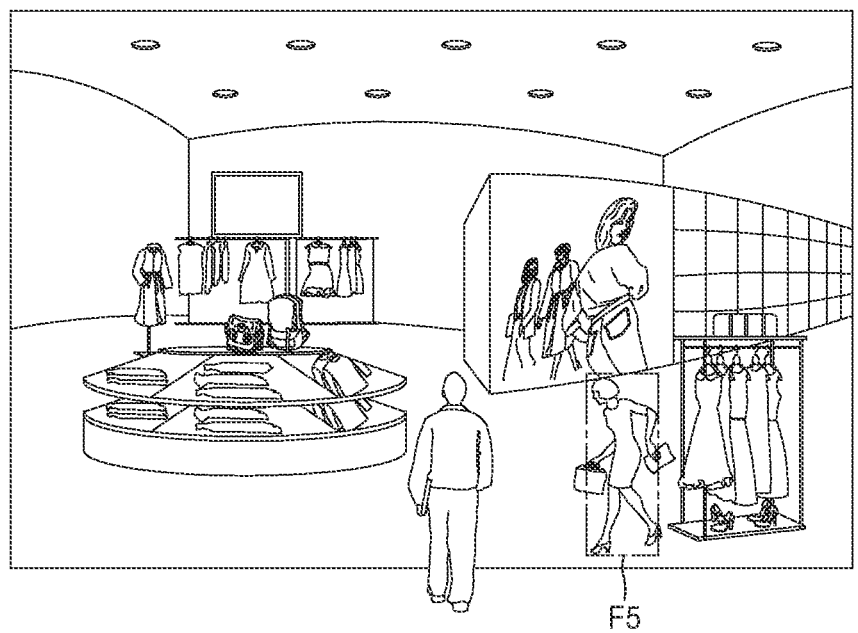
FIG. 7B illustrates a pictorial representation of the AR placed in the VR frame, in accordance with one or more embodiments.

Referring to FIG. 7A, a block diagram of a virtual scene processing module (208) is illustrated, in accordance with one or more embodiments. In one embodiment, the virtual scene processing module (208) includes an AR alignment sub-module (702) configured for aligning the AR of one of the one or more events in relation to the real environment. The virtual scene processing module (208) further includes an AR placement sub-module (704) configured for merging the aligned AR into the determined suitable part within the frame of the virtual reality environment, and maintaining the context of the virtual reality environment, as illustrated in FIG. 7B. Referring to FIG. 7B, which illustrates a pictorial representation of the AR placed in the VR frame, in accordance with one or more embodiments. As illustrated, the AR of the second user, entering the living room facing and moving towards the primary user, with hands down and smiling face, is in the suitable part of the frame such that not disrupting the context of the virtual environment.

Figure 8A:
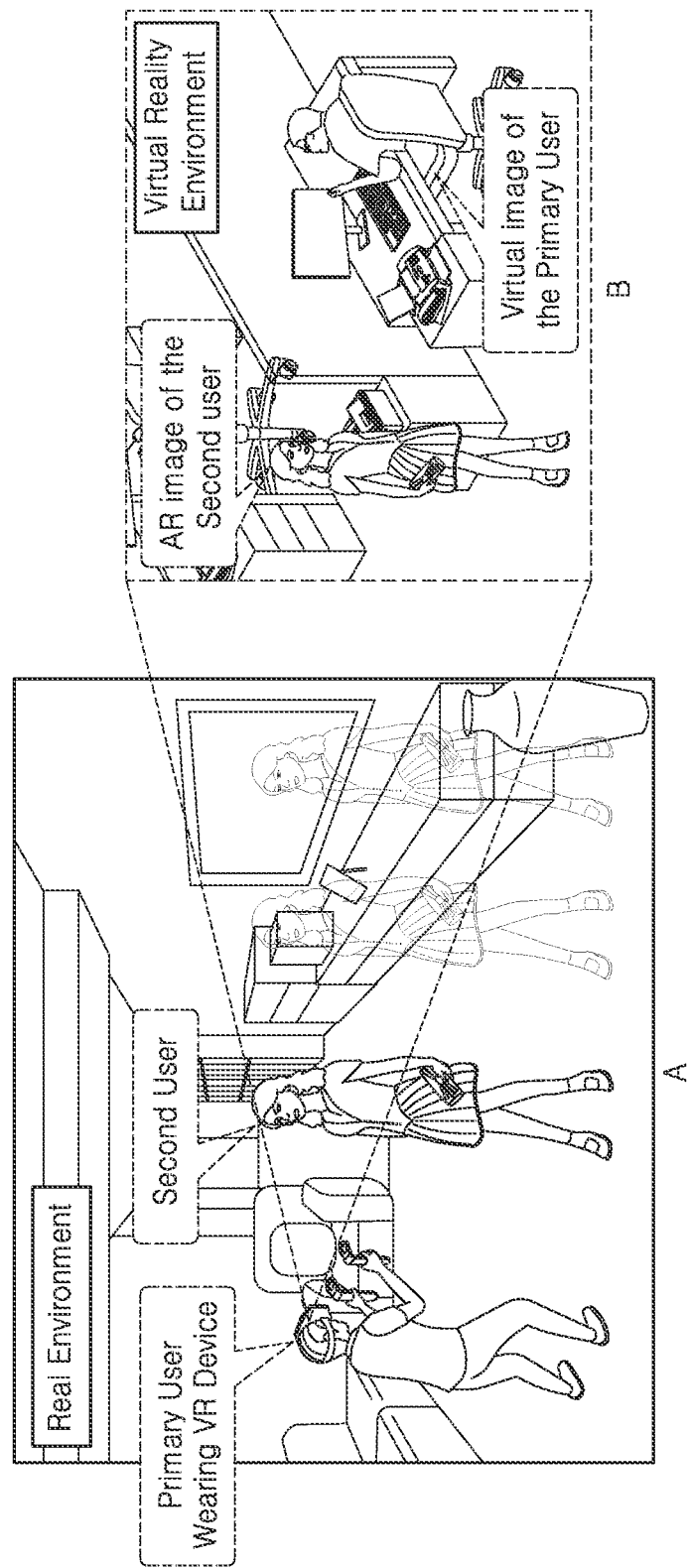
FIG. 8A illustrates a first use case for handling one or more events of a real environment in a virtual reality environment, in accordance with one or more embodiments.

Referring to FIG. 8A a first use case for handling one or more events of a real environment in a virtual reality environment is illustrated, in accordance with one or more embodiments. As illustrated in real space in FIG. 8A, in a real environment (A), the primary user is sitting on a sofa and through the virtual reality, device experiencing the virtual environment of the office. Further, it is illustrated that the second user is approaching to the first user in the real environment and the primary user is not aware of it as the first user is immersed in the virtual office environment. In the virtual reality environment (B), present the invention is utilized for handling the event of a second user approaching to the primary user in the real environment. Further, all the parameters of the second user in the real environment such as audio, gesture, emotion, view angle, inclination, and scaling as per distance with respect to the primary user are integrated in the virtual image of the second user. As illustrated, the second user is shown in the virtual reality environment approaching the first user from a location, which is in relation to the real environment and thus making the first user aware without disturbing the virtual environment.

Referring to FIG. 8B, a second use case for handling one or more events of a real environment in a virtual reality environment is illustrated, in accordance with one or more embodiments. As illustrated in real space in FIG. 8B, in real environment (A), the primary user is sitting on a sofa and through the virtual reality device attending the virtual meeting. Further, it is illustrated that the second user is approaching to the first user in the real environment and the primary user is not aware about it as the first user is immersed in the virtual environment. In the virtual reality environment (B), the present invention is utilized for handling the event of a second user approaching to the primary user in the real environment. Further, all the parameters of the second user in the real environment such as audio, gesture, emotion, view angle, inclination, and scaling as per distance with respect to the primary user are integrated in the virtual image of the second user. As illustrated, the second user is shown in the virtual reality environment approaching the first user from a location, which is in relation to the real environment and thus making the first user aware without disturbing the virtual environment.

Referring to FIG. 8C, a third use case for handling one or more events of a real environment in a virtual reality environment is illustrated, in accordance with one or more embodiments. As illustrated in real space in FIG. 8B, in a real environment (A), the primary user is sitting on a sofa and through the virtual reality, device visiting the shopping mall. Further, it is illustrated that the second user is approaching to the first user in the real environment and the primary user is not aware of it as the first user is immersed in the virtual environment. In the virtual reality environment (B), the present invention is utilized for handling the event of a second user approaching to the primary user in the real environment. Further, all the parameters of the second user in a real environment such as audio, gesture, emotion, view angle, inclination, and scaling as per distance with respect to the primary user are integrated with the virtual image of the second user. As illustrated, the second user is shown in the virtual reality environment approaching the first user from a location, which is in relation to the real environment and thus making the first user aware without disturbing the virtual environment.

It has thus been seen that the system and method for handling one or more events of a real environment in a virtual reality environment according to the present invention achieve the purposes highlighted earlier. Such a system and method can in any case undergo numerous modifications and variants, all of which are covered by the same innovative concept, moreover, all of the details can be replaced by technically equivalent elements. The scope of protection of the invention is therefore defined by the attached claims.

What is claimed is:
1. A method for handling an event of a real environment in a virtual reality (VR) environment, the method comprising:
  identifying an object, a user, and an event occurring in the real environment around a primary user wearing a VR module implemented by at least one hardware processor;

determining a first set of parameters of the identified object and the user, and a second set of parameters of the event and an actor in the event, wherein the actor performs the event and is the user;

analyzing a contextual importance of the object for a plurality of areas of a frame of the VR environment;

determining an area from among the plurality of areas of the frame of the VR environment based on the contextual importance, as a suitable part of the VR environment;

generating an augmented reality (AR) of the actor;

scaling, based on the first set of parameters and the second set of parameters, the AR;

aligning the AR in relation to the real environment; and merging the aligned AR into the suitable part of the VR environment while maintaining a context of the VR environment.

2. The method as claimed in claim 1, wherein the VR module is configured to provide information of the primary user and the VR module, comprising an absolute location and an absolute direction of the primary user and the VR module with respect to the real environment.

3. The method as claimed in claim 1, wherein the object and the user in the real environment are identified by an environment sensing sub-module,
   wherein the first set of parameters of the object and the user is determined by the environment sensing sub-module,
   wherein the event occurring in the real environment is identified by a real world scene analyzing sub-module,
   wherein the second set of parameters of the identified event and the actor in the event is determined by the real world scene analyzing sub-module, and
   wherein the environment sensing sub-module and the real world scene analyzing sub-module are implemented by the at least one hardware processor.

4. The method as claimed in claim 3, wherein the environment sensing sub-module is configured to communicate with a sensor, a location awareness sub-module, and an orientation awareness sub-module,
   wherein the sensor is configured to identify the object and the user in the real environment and comprises any of an image sensor, a touch sensor, a wearable sensor, a non-wearable sensor, and an audio sensor,
   wherein the location awareness sub-module and the orientation awareness sub-module are configured to determine the first set of parameters including absolute location and absolute direction of the object, the user, and a relative location and a direction of the object and the user with respect to the absolute location and the absolute direction of the primary user and the VR module, and
   wherein the location awareness sub-module and the orientation awareness sub-module are implemented by the at least one hardware processor.

5. The method as claimed in claim 3, wherein the real world scene analyzing sub-module is configured to:
   implement an object and actor analysis, an event and activity analysis, a gesture and an emotion analysis, and a relative position and orientation analysis identifying the event in the real environment; and
   determine the second set of parameters, of the event and the actor in the event, and indicate an activity performed in the event, a gesture, an audio, an emotion, a size, a location and a direction of the actor, a distance of the actor from the primary user, a direction of the actor with respect to the primary user and an orientation, an inclination, and a view angle with respect to the VR module.

6. The method as claimed in claim 1, wherein the analyzing of the contextual importance of the object comprises:
   splitting the frame of the VR environment into the plurality of areas;
   determining an absolute and relative orientation of each of the plurality of areas with respect to a virtual image of the primary user in the frame;
   identifying the object in at least one of the plurality of areas; and
   analyzing the contextual importance of the object for the plurality of areas of the frame of the VR environment based on the identified object.

7. The method as claimed in claim 6, wherein the determining of the area as the suitable part comprises:
   identifying, from the plurality of areas of the frame, the area of the frame that is editable and is determined to contains no significant information;
   receiving a size of the actor and a distance of actor from the primary user; and
   determining the area of the frame as the suitable part based on the size and the distance of the actor.

8. The method as claimed in claim 1, wherein the second set of parameters indicates a gesture, an emotion, an audio, an activity, a view angle, a direction of the actor, and an inclination, and
   wherein the AR is scaled based on the distance of the actor from the primary user.

9. The method as claimed in claim 1, wherein the aligning the AR of the actor in relation to the real environment is performed by an AR alignment sub-module,
   wherein the merging the AR in the suitable part of the VR environment is performed by an AR placement sub-module, and
   wherein the AR alignment sub-module and the AR placement sub-module are implemented by the at least one hardware processor.

10. A system for handling an event of a real environment in a virtual reality (VR) environment, the system comprising:
   at least one processor including processing circuitry; and
   memory storing one or more instructions that, when executed by the at least one processor, cause the system to:
      identify an object, a user, and an event occurring in the real environment around a primary user wearing a VR module, of the system and implemented by the at least one processor;
      determine a first set of parameters, of the object and the user, and a second set of parameters, of the event and an actor in the event, wherein the actor performs the event and is the user;
      analyze a contextual importance of the object for a plurality of areas of a frame of the VR environment;
      determine an area from among the plurality of areas of the frame of the VR environment based on the contextual importance, as a suitable part of the VR environment;
      generate an AR of the actor;
      scale, based on the first set of parameters and the second set of parameters, the AR;
      align the AR in relation to the real environment; and
      merge the AR into the suitable part of the VR environment while maintaining a context of the VR environment.

11. The system as claimed in claim 10, wherein the VR module is configured to provide information, of the primary user and the VR module, comprising an absolute location and an absolute direction of the primary user and the VR module with respect to the real environment.

12. The system as claimed in claim 10, wherein the one or more instructions, when executed by the at least one processor, further cause the system to:
identify the object and the user in the real environment and determine the first set of parameters of the object and the user;
identify the event occurring in the real environment; and
determine the second set of parameters of the event and the actor in the event.

13. The system as claimed in claim 12,
wherein the one or more instructions, when executed by the at least one processor, further cause the system to:
determine the first set of parameters including absolute location and absolute direction of the object, the user, and a relative location and a direction of the object and the user with respect to the absolute location and the absolute direction of the primary user and the VR module.

14. The system as claimed in claim 12, wherein the one or more instructions, when executed by the at least one processor, further cause the system to:
implement an object and actor analysis, an event and activity analysis, a gesture and an emotion analysis, and a relative position and orientation analysis identifying the event in the real environment, and
determine the second set of parameters, of the event and the actor in the event, and indicates an activity performed in the event, a gesture, an audio, an emotion, a size, a location and a direction of the actor, a distance of the actor from the primary user, a direction of the actor with respect to the primary user and an orientation, an inclination, and a view angle with respect to the VR module.

15. The system as claimed in claim 10, wherein the one or more instructions, when executed by the at least one processor, further cause the system to
split the frame of the VR environment into the plurality of areas;
determine an absolute and relative orientation of each of the plurality of areas with respect to virtual image of the primary user in the frame;
identify the object in at least one of the plurality of areas;
analyze the contextual importance of the object for the frame of the VR environment;
identify, from the plurality of areas of the frame, the area of the frame that is editable and is determined to contain no significant information;
receive a size of the actor and a distance of the actor from the primary user; and
determine the area of the frame as the suitable part based on the size and the distance of the actor.

16. The system as claimed in claim 10, wherein the one or more instructions, when executed by the at least one processor, further cause the system to
generate the AR of the actor determined the event;
integrate the second set of parameters which indicate a gesture, an emotion, an audio, an activity, a view angle, a direction of the actor, and an inclination; and
scale the AR based on the distance of the actor from the primary user.

17. The system as claimed in claim 10, wherein the one or more instructions, when executed by the at least one processor, further cause the system to
align the AR of the event in relation to the real environment;
merge the AR into the suitable part of the VR environment; and
maintain the context of the VR environment.

18. A method for handling an event of a real environment in a virtual reality (VR) environment, the method comprising:
identifying an object, a user, and an event occurring in the real environment around a primary user wearing a VR module implemented by at least one hardware processor;
determining a first set of parameters of the identified object and the user, and a second set of parameters of the event and an actor in the event, wherein the actor performs the event and is the user;
analyzing the VR environment to determine a suitable part in the VR environment;
creating an augmented reality (AR) of the actor;
scaling, based on the first set of parameters and the second set of parameters, the AR;
aligning the AR in relation to the real environment; and
merging the aligned AR into the suitable part of the VR environment while maintaining a context of the VR environment,
wherein the object and the user in the real environment are identified by an environment sensing sub-module,
wherein the first set of parameters of the object and the user is determined by the environment sensing sub-module,
wherein the event occurring in the real environment is identified by a real world scene analyzing sub-module,
wherein the second set of parameters of the identified event and the actor in the event is determined by the real world scene analyzing sub-module,
wherein the environment sensing sub-module and the real world scene analyzing sub-module are implemented by the at least one hardware processor, and
wherein the real world scene analyzing sub-module is configured to:
implement an object and actor analysis, an event and activity analysis, a gesture and an emotion analysis, and a relative position and orientation analysis identifying the event in the real environment, and
determine the second set of parameters, of the event and the actor in the event, and indicate an activity performed in the event, a gesture, an audio, an emotion, a size, a location and a direction of the actor, a distance of the actor from the primary user, a direction of the actor with respect to the primary user and an orientation, an inclination, and a view angle with respect to the VR module.

* * * * *